J. S. TEFFT.
Plow.
No. 2,762. Patented Aug. 25, 1842.
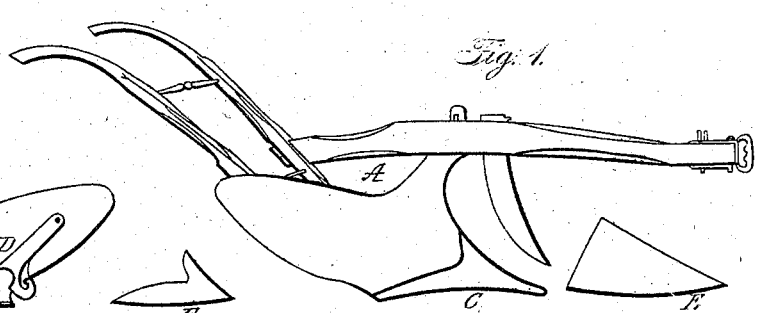
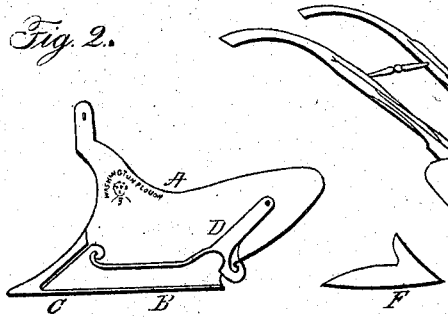
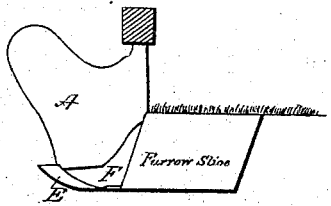

UNITED STATES PATENT OFFICE.

JAIRUS S. TEFFT, OF AMHERST, NEW YORK.

IMPROVEMENT IN THE CONSTRUCTION OF PLOWS.

Specification forming part of Letters Patent No. 2,762, dated August 25, 1842.

*To all whom it may concern:*

Be it known that I, JAIRUS S. TEFFT of the town of Amherst, in the county of Erie and State of New York, have invented a new and useful Improvement in the Plow; and I do hereby declare that the following is a full, clear, and exact description thereof, reference being had to the accompanying drawings, making a part of this specification, in which—

Figure 1 is the plow, with handles and beam attached; Fig. 2, the landside; Fig. 3, front view, showing the slant of the share and landside at *e*.

The plow is composed of a mold-board, A, having a recess at its forward end to receive a share, C, which is fitted thereto, its front edge extending up and forming the cutter, and forward, so as to form the point of the plow below. This form of mold-board and share are similar to many now in use and well known, except in the following particular: they incline from the bottom of the plow upward over toward the land at the cutting-edge, the landside B also inclining under, so as to lean over onto the land. This form of the landside will cause the plow to cut a furrow-slice the cross-section of which forms a rhomboid, and is much easier turned over than one cut by a plow whose landside is vertical or inclines the other way. If a cutter is used before the cutting-edge of the share it is attached to the side of the plow-beam, and has the same inclination as the landside. The mold-board is also formed flat on the under side, so as to receive another share on the under side when it is desirable to change from a cast to a wrought iron share. This share E is formed of a flat triangular plate of iron, the cutting-edge of which is slightly convex and sharpened. It is fastened in its place on the under side of the mold-board by a bolt passing through them both. When this share is substituted for that marked C a false share, F, is affixed, which fills the recess in the mold-board, it being of the same shape as the upper part of the share C, the lower or cutting edge being formed by the share E. By this arrangement either a cast or wrought iron share can be used, as the nature of the soil requires.

What I claim as my invention, and desire to secure by Letters Patent, is—

1. Constructing the mold-board and shares C and E F of a plow so that a share can be applied to either the upper or under side of the mold-board, in the manner and for the purpose herein set forth.

2. The inclination of the cutter and landside so as to cut a rhomboidal furrow-slice, as above described.

JAIRUS S. TEFFT.

Witnesses:
N. K. HALL,
J. S. KING.